Patented Jan. 25, 1944

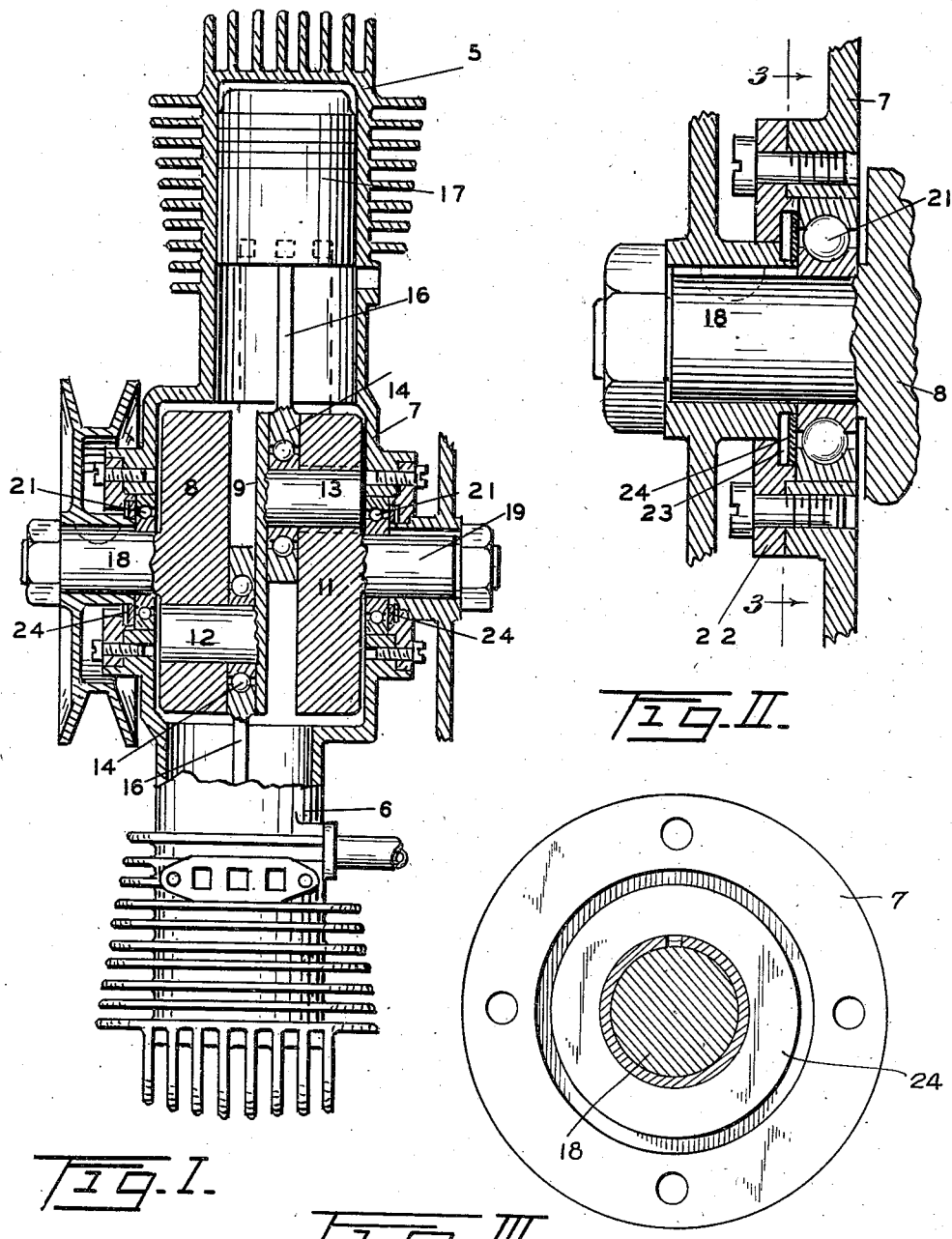

2,339,985

UNITED STATES PATENT OFFICE 2,339,985

ENGINE CONSTRUCTION

William B. Engler, San Francisco, Calif.

Application July 14, 1942, Serial No. 450,891

3 Claims. (Cl. 123—56)

This invention relates to improvements in internal combustion engines, particularly of the two-cycle, two-cylinder opposed type.

The principal object of this invention is to produce an engine having opposed cylinders in substantially axial alignment through the medium of a built up crank shaft.

A further object is to provide means whereby the opposing cylinders employ a common crank case compression chamber and also to provide valves to prevent leakage of the gases past the crank shaft bearings.

A still further object is to produce, in a device of this character, a nearly perfect running balance of the moving parts and also an engine of unusual compactness.

Other objects and advantages will be apparent in the course of the following description.

In the accompanying drawing forming a part of this specification and in which like numerals are employed to designate like parts throughout the same, Fig. I is a fragmentary cross-sectional view of an engine constructed in accordance with my invention and, Fig. II is an enlarged cross-sectional fragmentary view showing one of the valves for preventing leakage of gases past the crank shaft bearings.

Fig. III, which is a cross-sectional view taken on the line 3—3 of Fig. II looking from the left.

In the many uses to which the small internal combustion engine is well adapted, light weight, economy of space and freedom from vibration are highly desirable characteristics. In the usual construction of a two cylinder opposed engine the axes of the cylinders are separated to considerable distance with the consequence of serious vibration from the moving parts.

It is my intention to construct a crank shaft by building up the same in such a manner that the axial offset of the two cylinders is very small and, in consequence, the vibration slight.

In order to prevent leakage of the gases past the crank shaft bearings I provide a valve-like seal which has a limited movement, in the direction of the axis of the crank shaft, and, bearing against outer and inner seats, prevents the passage of gases, as will readily be understood by reference to the drawing.

Referring to the drawing, the numerals 5 and 6 indicate the cylinders which may be attached to or made integral with the crank casing 7, this being immaterial to my invention.

Within the crank casing I position the crank shaft, which is built up of three discs 8, 9 and 11, the discs 8 and 11 being relatively thick. The disc 9 is relatively thin and has integral with it two oppositely disposed crank pins 12 and 13.

These pins are firmly fixed in the discs 8 and 11 respectively by keys or splines or any other effective manner. Each of these pins carries on it a ball, or other anti-friction bearing, as shown at 14, which in turn carries one of the connecting rods 16, which in turn is connected to one of the pistons 17.

The discs 8 and 11 each has, at its center, a projecting stub shaft which, in turn, is supported in the crank case 7 by a ball or other anti-friction bearing 21.

By referring to Fig. II, it will be noted that, in accordance with usual practice, the outer and inner raceways of the ball bearing 21 are somewhat separated which would permit the passage of gas through the bearing. Therefore, I have formed outside of this bearing, through the medium of plate 22, a chamber 23, in which is slidably positioned an annular valve 24. This valve abuts the raceways of the ball bearing and spans the gap between them, thereby preventing the ingress of air to the crank case. In the case of pressure of gas in the crank case the valve will move outward or to the left on the drawing Fig. II, and contacting the annular seats therefor provided, prevent the escape of gas from the crank case.

It will thus be noted that I have produced a structure in which, by means of a unique construction of crank shaft permitting the employment of anti-friction bearings, the two cylinders are brought closely into axial alignment. This results in an engine of unusually compact construction, and due to the close balance of its moving parts, one largely free from vibration. Furthermore, I have provided a seal at the crank shaft bearings that is very economical of space, adding thereby to the compactness of the whole design.

It is to be understood that the form of my invention herein shown and described is to be taken only as a preferred example of the same and that various changes relative to material, size, shape and arrangements of parts may be resorted to without departing from the spirit of the invention or the scope of the subjoined claims.

Having thus described my invention, I claim:

1. In an internal combustion engine, a pair of opposed cylinders in substantially axial alignment one with the other, of a crank shaft interposed between said cylinders, said crank shaft being constructed of axially arranged discs, pins carried by said discs, connecting rods connecting said pins to pistons mounted in said cylinder, one of said discs being relatively thin, whereby said connecting rods will be in relatively close parallel alignment.

2. A crank for an internal combustion engine, including a pair of discs, each having a stub shaft centrally positioned thereon, a relatively thin disc interposed between said first mentioned discs, and oppositely disposed offset pins carried by said disc and connected to said first mentioned discs, whereby the axis of the connecting rods of an engine are mounted in parallel alignment and in close proximity to each other.

3. In an internal combustion engine, a crank case, opposed cylinders connected thereto, a crank shaft mounted within said crank case, stub shafts extending from said crank and passing through ball bearings mounted in said case, and movable valves spanning said ball bearings, said valves being capable of moving to and away from said ball bearings.

WILLIAM B. ENGLER.